United States Patent [19]
Ulshafer, Jr.

[11] 4,377,296
[45] Mar. 22, 1983

[54] HITCHING APPARATUS

[76] Inventor: Carl Ulshafer, Jr., 415 Main, Ida Grove, Iowa 51445

[21] Appl. No.: 275,985

[22] Filed: Jun. 22, 1981

[51] Int. Cl.³ .......................................... B62D 53/06
[52] U.S. Cl. ................................ 280/425 R; 172/248; 280/477
[58] Field of Search ............. 280/415 R, 425 R, 477, 280/478 R, 479 R; 172/248, 443, 448

[56] References Cited

U.S. PATENT DOCUMENTS

| | | | |
|---|---|---|---|
| 2,464,424 | 3/1949 | Weldon et al. | 280/477 |
| 2,869,654 | 1/1959 | Hershman | 172/272 |
| 3,090,639 | 5/1963 | Virtue et al. | 280/474 |
| 3,325,186 | 6/1967 | Lund | 280/477 |
| 4,090,725 | 5/1978 | Perin | 280/479 A |
| 4,148,497 | 4/1979 | Genty | 280/479 A |
| 4,149,736 | 4/1979 | von Allworden | 280/477 |
| 4,184,558 | 1/1980 | de Buhr et al. | 280/477 |
| 4,232,878 | 11/1980 | Moore, Jr. | 280/461 A |
| 4,254,968 | 3/1981 | Del Vecchio | 280/477 |
| 4,343,484 | 8/1982 | Von Antwerp | 280/415 R |

FOREIGN PATENT DOCUMENTS

| | | | |
|---|---|---|---|
| 2900866 | 7/1980 | Fed. Rep. of Germany | 280/477 |
| 59731 | 7/1954 | France | 280/477 |

Primary Examiner—Joseph F. Peters, Jr.
Assistant Examiner—Ross Weaver
Attorney, Agent, or Firm—Henderson & Sturm

[57] ABSTRACT

A hitching apparatus for a draft vehicle including a pressure actuated latching mechanism and a lifting guide attached to the drawbar of the draft vehicle, and a lifting device operably connected to the hydraulic power lift system of the draft vehicle. The lifting device comprises a frame attached to the power lift system and a lifting bracket pivotally mounted on and vertically adjustable with respect to the frame. The lifting bracket includes an elongated slot adapted to receive a pin secured to the draft tongue of a trailing vehicle or implement to raise and position the draft tongue for coupling with the latching mechanism.

10 Claims, 9 Drawing Figures

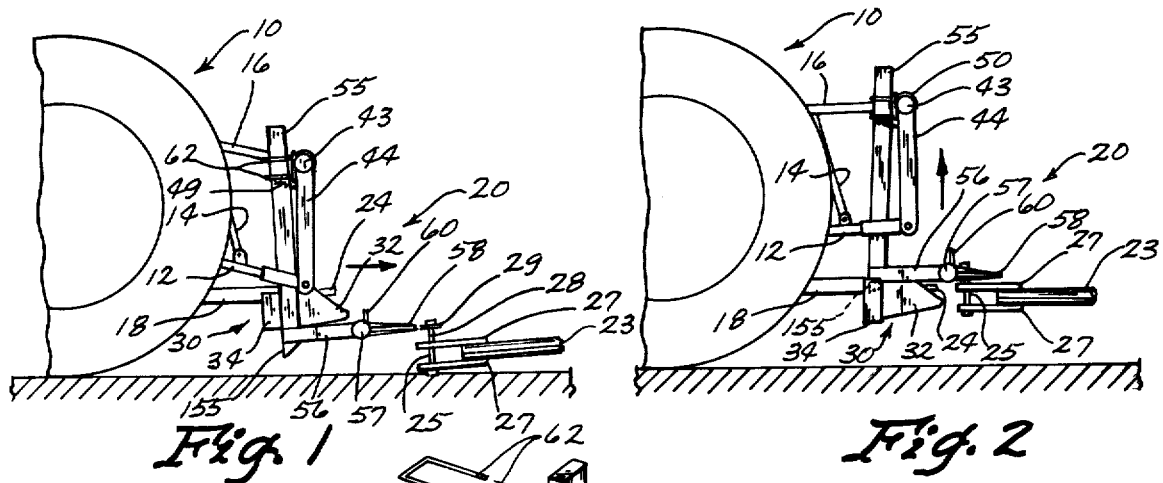
Fig. 1
Fig. 2
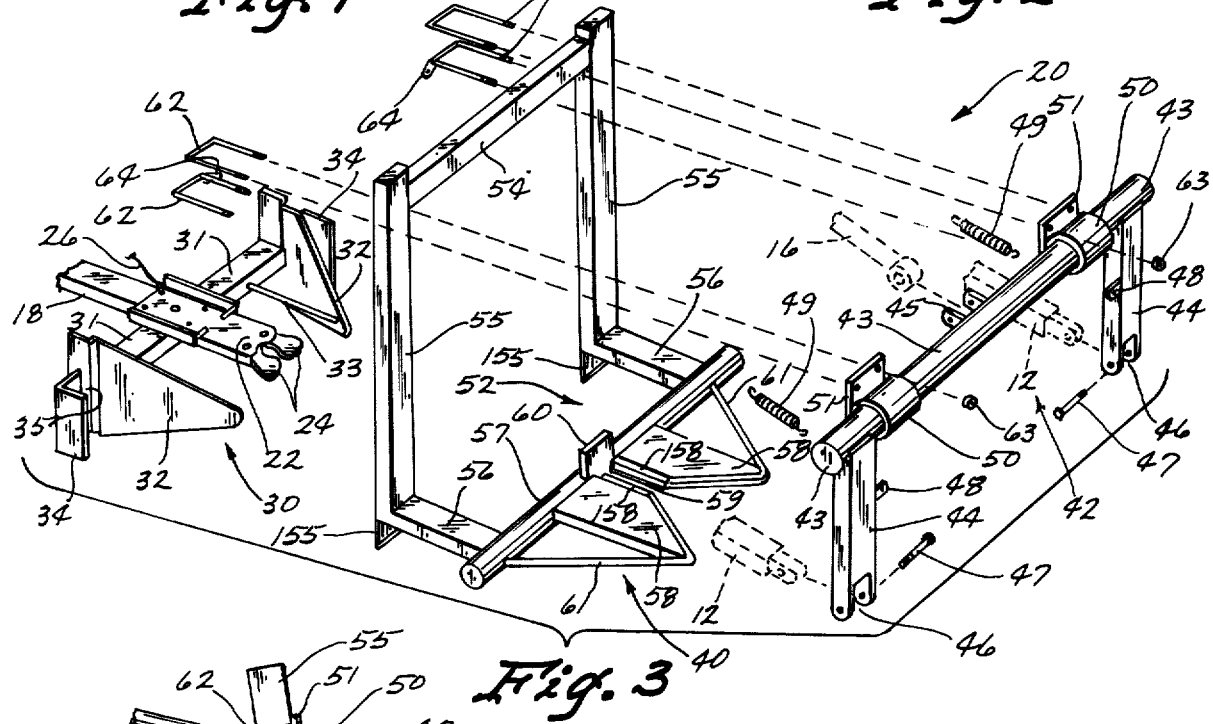
Fig. 3
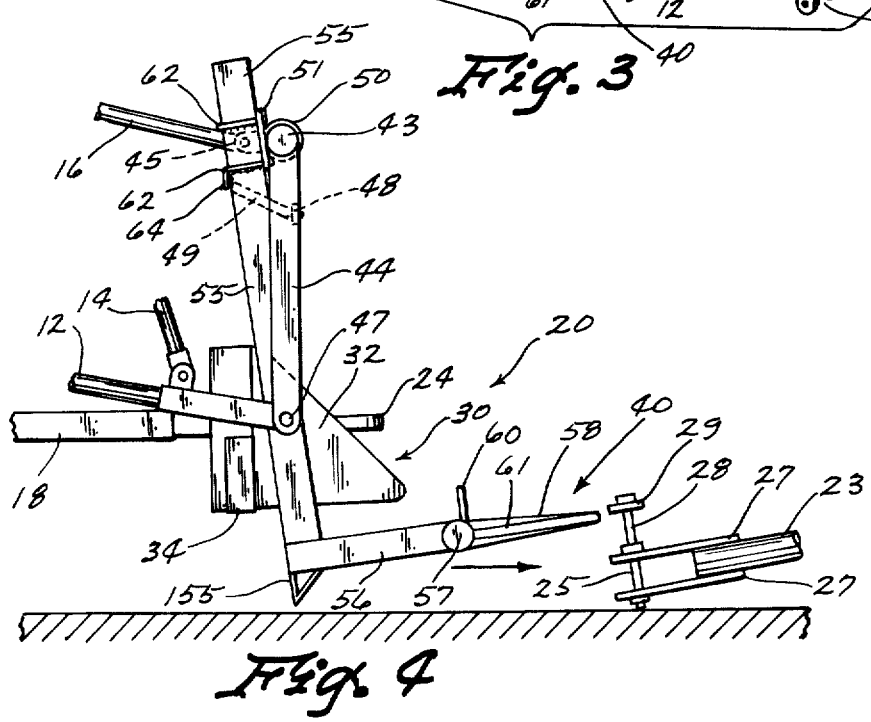
Fig. 4

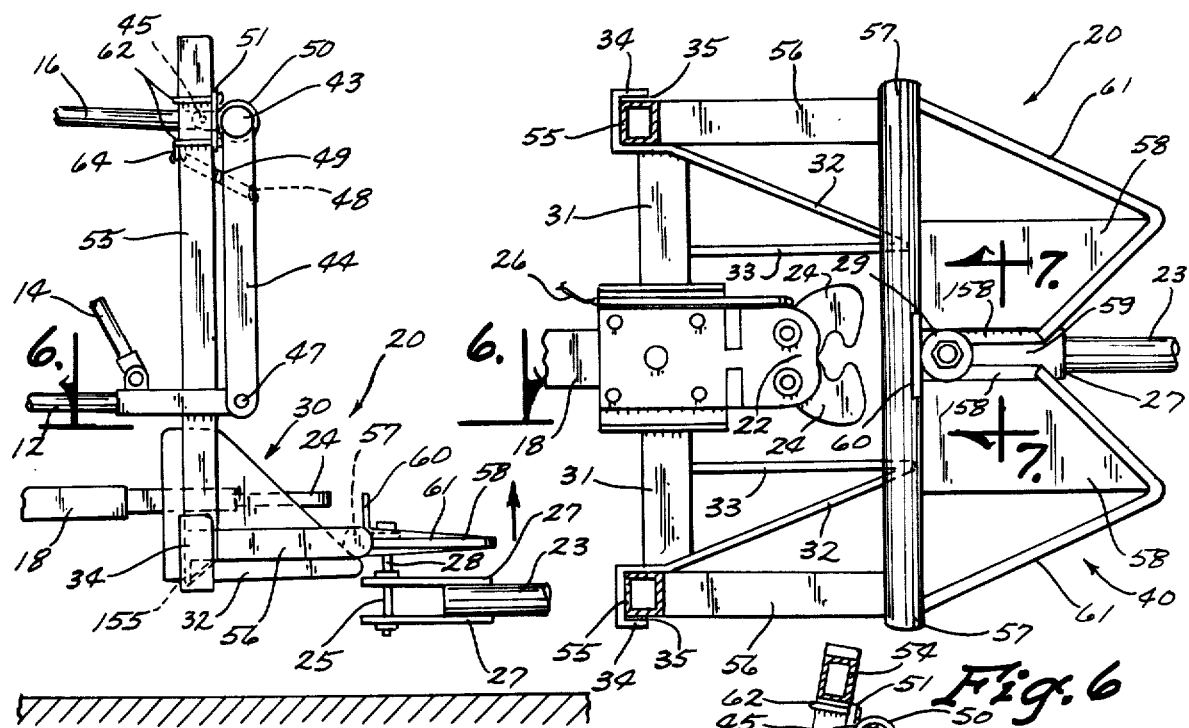
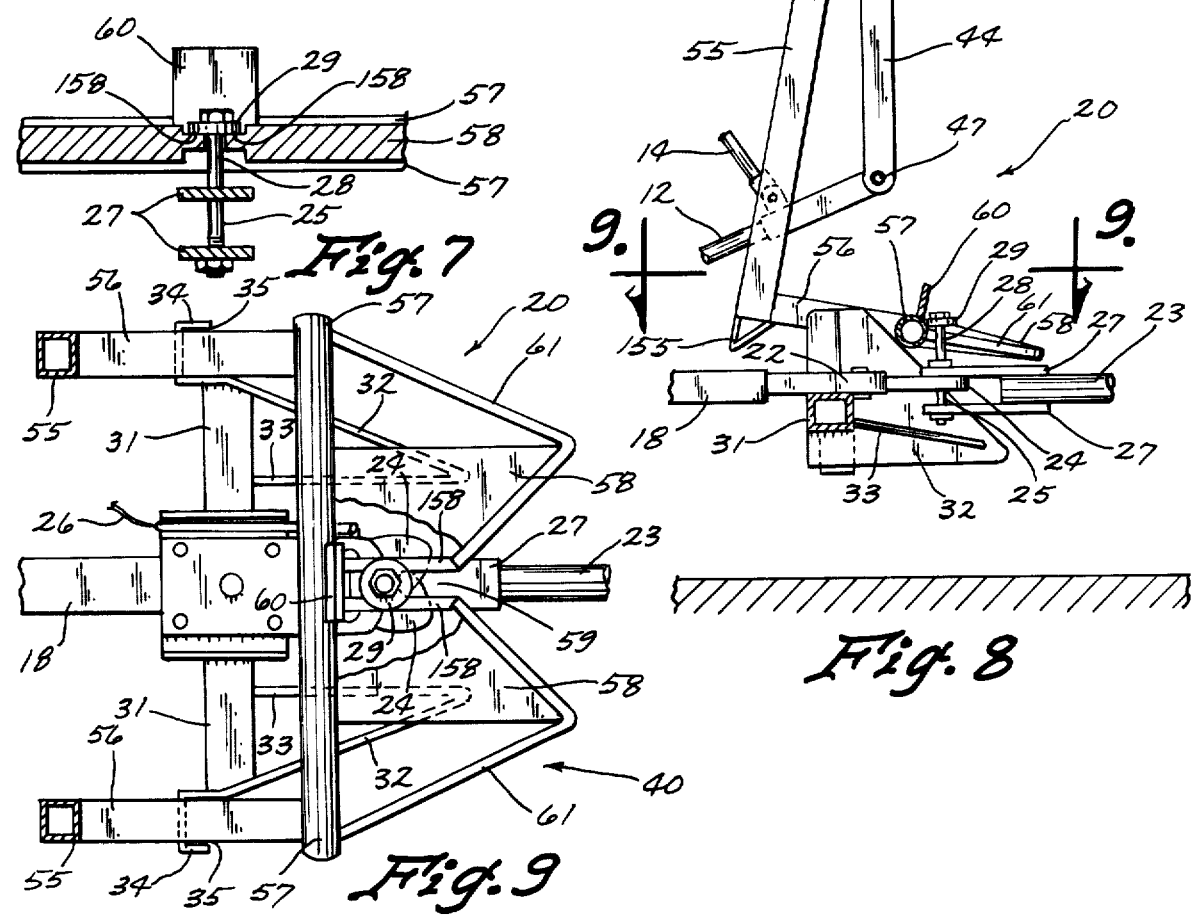

HITCHING APPARATUS

BACKGROUND OF THE INVENTION

The present invention relates generally to hitching devices and more particularly to a hitching apparatus that can be used to accomplish all operations necessary to connect trailing vehicles or implements to draft vehicles directly from the operator's station.

Hitching devices presently available have several disadvantages, including highly complex structures resulting in the need for levers, rods, cables or the like extending to the operator's station. Further these complex structures require a great deal of operator time to install and disassemble which limits the flexibility of the draft vehicle. Those concerned with these and other problems recognize the need for an improved hitching apparatus.

SUMMARY OF THE INVENTION

The present invention discloses a hitching device for coupling a trailing vehicle or implement to a draft vehicle without requiring the operator to leave his station. The hitching apparatus includes a pressure actuated latching mechanism and a lifting guide attached to the drawbar of the draft vehicle. The lifting device is mounted on the standard three point hitch of a tractor and is independent of the drawbar. The lifting device includes a frame mounted on the three point hitch and a lifting bracket biased toward, pivotally mounted on, and vertically adjustable with respect to the frame. The lifting bracket includes a converging pin guide terminating in an elongated slot. The slot is adapted to receive a pin which projects from the draft tongue of a trailing vehicle or implement. Engagement of the projecting pin within the slot enables the lifting bracket to raise and position the draft tongue for coupling with the latching mechanism.

An object of the present invention is the provision of an improved hitching apparatus.

Another object is to provide a hitching apparatus that is controlled by the hydraulic power lift system or three point hitch of a draft vehicle.

A further object of the invention is the provision of a hitching apparatus that facilitates the hitching operation without requiring the operator to leave his station on the draft vehicle.

Still another object is to provide a hitching apparatus that is easily mounted on and dismounted from a draft vehicle.

A still further object of the present invention is the provision of a hitching apparatus that is easily operated and maintained.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view showing the hitching apparatus in the lowered position wherein the lifting bracket is being positioned to engage the projecting pin of the draft tongue;

FIG. 2 is a side elevational view similar to FIG. 1, but showing the lifting bracket and draft tongue in an intermediate raised position;

FIG. 3 is an exploded perspective view showing the pressure actuated latching mechanism and lifting guide attached to the drawbar, and the frame and lifting bracket of the lifting device which is operably connected to a three point hitch;

FIG. 4 is a side elevational view showing the hitching apparatus in the lowered position;

FIG. 5 is a side elevational view showing the hitching apparatus in an intermediate raised position;

FIG. 6 is a top plan view taken along line 6—6 of FIG. 5;

FIG. 7 is a sectional view taken along line 7—7 of FIG. 6;

FIG. 8 is a side elevation cross-sectional view showing the hitching apparatus in the fully raised position wherein the clevis pin in the draft tongue is engaging the pressure actuated latching mechanism to complete the coupling operation; and FIG. 9 is a top plan view taken along line 9—9 of FIG. 8, with cut-away portions to show the latching mechanism.

DESCRIPTION OF THE PREFERRED EMBODIMENTS

Referring now to the drawings wherein like reference numerals designate identical or corresponding parts throughout the several views, FIG. 1 shows the hitching apparatus of the present invention mounted on a tractor generally designated by reference numeral 10. The tractor 10 has a power lift system including a pair of generally vertically and laterally swingable draft links 12 connected at their forward ends for universal movement relative to the tractor 10. The draft links 12 are connected by lift links 14 which form a part of the hydraulic power lift system carried by and forming a part of the tractor 10. The power lift system illustrated in FIGS. 1 and 2 also includes a stabilizer link 16 pivotally attached to the tractor 10, which together with the draft links 12 forms a conventional three point hitch. The tractor 10 also includes a drawbar 18 connected at its forward end with the tractor 10 to receive draft power therefrom.

As most clearly shown in FIG. 3, the hitching apparatus, indicated in its entirety by reference numeral 20, includes a pressure actuated latching mechanism or red dog hitch 22 attached to the end of drawbar 18. The latching mechanism 22 comprises a pair of counter opposing spring biased clamps 24 adapted to receive a clevis pin 25. As the clevis pin 25 contacts the clamps 24, the pressure exerted by pin 25 trips the clamps 24 to a closed position. To disengage the latching mechanism 22, line 26 is pulled by the operator to move the clamps 24 to an open position.

Also mounted on drawbar 18 is a lifting guide 30 which includes a horizontal support 31 having a flange 32 attached to each end thereof. The flanges 32 extend rearwardly from support 31 and the ends thereof are spaced laterally from the latching mechanism 22. Brace 33 interconnects support 31 and the rearward end of flange 32. Spaced outwardly from and attached to each flange 32 is a rearwardly extending tab 34 which together with flange 32 forms a vertical channel or stop 35 therebetween.

Again referring to FIG. 3, the lifting device, generally designated by reference numeral 40, includes a frame 42 and a lifting bracket 52 biased toward, pivotally mounted on, and vertically adjustable with respect to frame 42.

Frame 42 comprises a rounded horizontal shaft 43 having vertical legs 44 attached to each end thereof. Shaft 43 includes a clevis 45 which receives the end of stabilizer link 16 to operably connect it thereto by insertion of a bolt or the like. Each leg 44 carries a clevis 46 at the end thereof to receive the end of draft link 12 which is connected thereto by bolt 47. Each leg 55 also includes a tab 48 attached thereto to secure one end of extension spring 49. A pair of pillow block bearings 50, including mounting plates 51, are journaled on shaft 43 of frame 42.

Lifting bracket 52 consists of a horizontal top bar 54 interconnecting two vertically disposed columns 55. Ground cleats 155 are attached to the lowermost ends of columns 55. Beams 56 extend rearwardly from columns 55 and the ends thereof are interconnected by roll bar 57. Converging pin guides 58, including counter opposing recessed ledges 158, extend rearwardly from roll bar 57. The rearward ends of ledges 158 are closed thus forming an elongated recessed slot 59 therebetween. Stop plate 60 is secured to roll bar 57 at the forward end of slot 59. Braces 61 interconnect roll bar 57 and the rearward ends of pin guides 58.

The lifting bracket 52 is mounted on frame 42 by U-bolts 62. U-bolts 62 connect columns 55 to mounting plates 51 on frame 42 and are secured by nuts 63. Tabs 64 are attached to U-bolts 62 to receive an end of extension spring 49. Thus, lifting bracket 52 is biased toward frame 42 by springs 49, pivotally mounted on frame 42 by bearings 40, and vertically adjustable with respect to frame 42 since the U-bolts 62 can engage columns 55 over a substantial portion of their length.

As most clearly shown in FIG. 4, the distal end of the draft tongue 23 carries a pair of clevis plates 27 and clevis pin 25 is secured therebetween. An upwardly projecting pick-up pin 28 having an enlarged head or washer 29 is attached to upper clevis plate 27.

In operation the hitching apparatus 20 is mounted on the three point hitch of and drawbar 18 of the tractor 10 as described hereinbefore. The lifting bracket 52 is vertically adjusted with respect to frame 42 by adjustment of U-bolts 62 such that when the three point hitch is in the maximum raised position, the ground cleats 155 clear the tops of channels or stops 35.

To hitch a trailing vehicle or implement, the three point hitch, and thus the lifting device 40, is lowered to the position shown in FIG. 4. The tractor 10 is then backed up so that the pin guides 58 engage the pick-up pin 28 and guide it into recessed slot 59. As the three point hitch is raised, the washer 29 is received in recessed slot 59 and the draft tongue 23 is elevated as shown in FIGS. 5 and 6. With the washer 29 positioned in the recessed slot 59 it is prevented from rearward movement by the closed ends of ledges 158 and is therefore prevented from accidentally slipping out of slot 59 under conditions such as sudden tractor movement or when the hitching operation is attempted on an inclined surface.

When ground cleats 155 of the lifting bracket 42 clears the channel or stop 35 of lifting guide 30, the tractor 10 is backed up further so that the clevis pin 25 engages the latching mechanism 22 and trips the clamps 24 to a closed position, thus completing the coupling operation (FIGS. 8 and 9). The three point hitch is then lowered so that the bottoms of beams 56 rest on the tops of channels or stops 35. This lowering operation causes the washer 29 to raise up out of recessed slot 59 above the closed ends of ledges 158, thus the washer 29 is no longer prevented from rearward movement.

It is to be understood that the lifting guide 30 need not include structure other than the channels or stops 35. However, flanges 32 and tabs 34 are shown and described herein and provide the advantage of stabilizing and guiding the lifting bracket 52 when side loads are exerted. Although the draft links 12 of the three point hitch generally have limited side movement, as the three point hitch system wears with use, increased side movement is common.

To unhitch, the operator merely pulls the line 26 to move the clamps 24 to the open position and then drives forward. Since the washer 29 is no longer restricted from rearward movement, the pick-up pin 28 slides out of slot 59 and the draft tongue 23 drops to the ground.

Obviously many modifications and variations of the present invention are possible in light of the above teachings. It is therefore to be understood that, within the scope of the appended claims, the invention may be practiced otherwise than as specifically described.

I claim:

1. A hitching apparatus for coupling the draft tongue of a trailing vehicle or implement to the drawbar of a draft vehicle having a power lift system, said hitching apparatus comprising:
   a projecting pick-up pin attached to the draft tongue;
   a latching mechanism attached to the drawbar;
   a lifting guide attached to the drawbar, said lifting guide including a stop;
   a lifting device including a frame attached to the power lift system of the draft vehicle and a lift bracket pivotally attached to said frame;
   said lifting bracket including means for engaging said pick-up pin;
   said lifting device being moveable between a lowered position wherein the lifting bracket engages said pick-up pin, and a raised position wherein the lifting bracket contacts said stop of said lifting guide and guides and aligns said draft tongue for coupling with said latching mechanism.

2. The hitching apparatus of claim 1, wherein said pick-up pin projects upwardly from said draft tongue and includes an enlarged head.

3. The hitching apparatus of claim 1, wherein said latching mechanism is pressure actuated to a closed position.

4. The hitching apparatus of claim 1, wherein said lifting guide further includes rearwardly extending guide flanges spaced laterally from said latching mechanism, and wherein said guide flanges diverge forwardly and include an upwardly inclined top edge, whereby sliding contact of the lifting bracket with the guide flanges aligns and positions the lifting bracket horizontally and vertically with respect to said latching mechanism.

5. The hitching apparatus of claim 1, wherein said power lift system is a three point hitch.

6. The hitching apparatus of claim 1, wherein said lifting bracket is vertically adjustable with respect to said frame.

7. The hitching apparatus of claim 1, wherein said lifting bracket is biased toward said frame.

8. The hitching apparatus of claim 2, wherein said pick-up pin engaging means includes a pair of forwardly converging pin guides and an elongated slot formed therebetween, said slot being disposed to receive said pick-up pin such that the enlarged head of said pick-up pin engages the top of said pin guides and said lifting bracket is raised from the lowered position.

9. The hitching apparatus of claim 3, wherein said draft tongue includes a pair of clevis plates attached to the end of said draft tongue and a clevis pin secured therebetween, wherein said clevis pin engages said pressure actuated latching mechanism when said lifting bracket is in the uppermost raised position, to move said latching mechanism to the closed position, thereby completing the coupling operation.

10. The hitching apparatus of claim 7, wherein said lifting bracket is spring biased toward said frame.

* * * * *